United States Patent [19]

Makowski

[11] Patent Number: 5,404,571
[45] Date of Patent: Apr. 4, 1995

[54] TDMA RADIO NETWORK WITH PROVISION FOR A GROUP CALL CHANNEL FOR DESIGNATED SATELLITE STATIONS

[75] Inventor: Pierre Makowski, Prunay, France

[73] Assignee: U.S. Philips Corporation, New York, N.Y.

[21] Appl. No.: 988,630

[22] Filed: Dec. 10, 1992

[30] Foreign Application Priority Data

Dec. 23, 1991 [FR] France .................... 91 16032

[51] Int. Cl.⁶ .................................... H04B 7/00
[52] U.S. Cl. .................... 455/33.1; 455/34.1; 455/56.1; 370/95.3
[58] Field of Search .................. 455/33.1, 34.1, 34.2, 455/54.1, 54.2, 56.1; 370/95.3

[56] References Cited

U.S. PATENT DOCUMENTS

| 4,817,190 | 3/1989 | Comroe et al. | 455/56.1 |
| 5,014,345 | 5/1991 | Comroe et al. | 455/54.2 |
| 5,117,501 | 5/1992 | Childress et al. | 455/34.1 |

FOREIGN PATENT DOCUMENTS 4011648 10/1991 Germany .
WO8810547 12/1988 WIPO .

OTHER PUBLICATIONS

M. Coudreuse, G. Delavoipiere, G. Duysens and B. Fino, Mobile Trunked Radio–communications Systems TN 10–TN100–TN200, Commutation & Transmission No. 2, 1989, pp. 39–50.

Primary Examiner—Reinhard J. Eisenzopf
Assistant Examiner—Andrew Faile
Attorney, Agent, or Firm—Leroy Eason

[57] ABSTRACT

The radio transmission system includes at least one base station (RA or RB) and at least one satellite station (M1, ..., M7) situated in a coverage zone (ZA, ZB) of the base station in which the base station can send information to a satellite station by a down transmission channel ($F_{RAM}$), while one transmission channel is used in which the satellite stations are authorized to transmit. For establishing a group call at the request of a satellite station, the base station allocates a group call channel to the requesting station so that exchange of information can take place directly between the mobile stations which are included in the group call.

3 Claims, 2 Drawing Sheets

TDMA RADIO NETWORK WITH PROVISION FOR A GROUP CALL CHANNEL FOR DESIGNATED SATELLITE STATIONS

BACKGROUND OF THE INVENTION

1. Field of the Invention

The invention relates to a radio transmission system comprising at least one base station and at least one satellite station situated in a coverage zone of the base station in which the base station can send information to a satellite station through a down transmission channel while an up transmission channel is used in which the satellite stations axe authorized to transmit.

Such a system has important fields of application when these systems are used as private systems (as opposed to the public system). In private systems, the distribution of radio resources among users is essential for optimizing the use of the allocated radio spectrum and avoiding saturation, while providing a varied range of services.

2. Description of the Related Art

Such a system is described, for example, in the journal Commutation & Transmission, no. 2, 1989, in the article: "Les systèmes de radiocommunication mobile á ressources partagées TN10-TN100-TN200" by M. Coudreuse, G. Delavoipière, G. Duysens, B. Fino.

One of these important services is the group call which renders possible a communication between a plurality of users.

In known systems, this group call includes the intervention of at least one base station which puts the users included in this call and situated within its coverage into communication with one another. This results in a first disadvantage in that the group call leads to a considerable mobilization of resources, especially when several base stations axe involved in the group call. Another disadvantage is that quite often the group call is only meant for those speakers of the group who are close to the originator of the call (for example: a call by a taxi which requires assistance from other vehicles of the same company close to the vehicle which has broken down).

SUMMARY OF THE INVENTION

The present invention proposes a system of the kind mentioned in the opening paragraph which counteracts the foregoing disadvantage to a high degree.

For this purpose, such a system is characterized in that, in order to effect a group call from a requesting station, the base station allocates a group call channel to the requesting station and to potential stations called up so that the exchange of information can take place over such channel between the mobile stations included in the group call.

It therefore is no longer necessary to include a plurality of base stations to which satellite stations are linked which are close to one another, but belong to different coverage zones.

BRIEF DESCRIPTION OF THE DRAWINGS

The following description together with the annexed drawings, all given by way of non-limitative example, will render it clear how the invention may be carried into practice.

DESCRIPTION OF THE PREFERRED EMBODIMENTS

Figure 1:
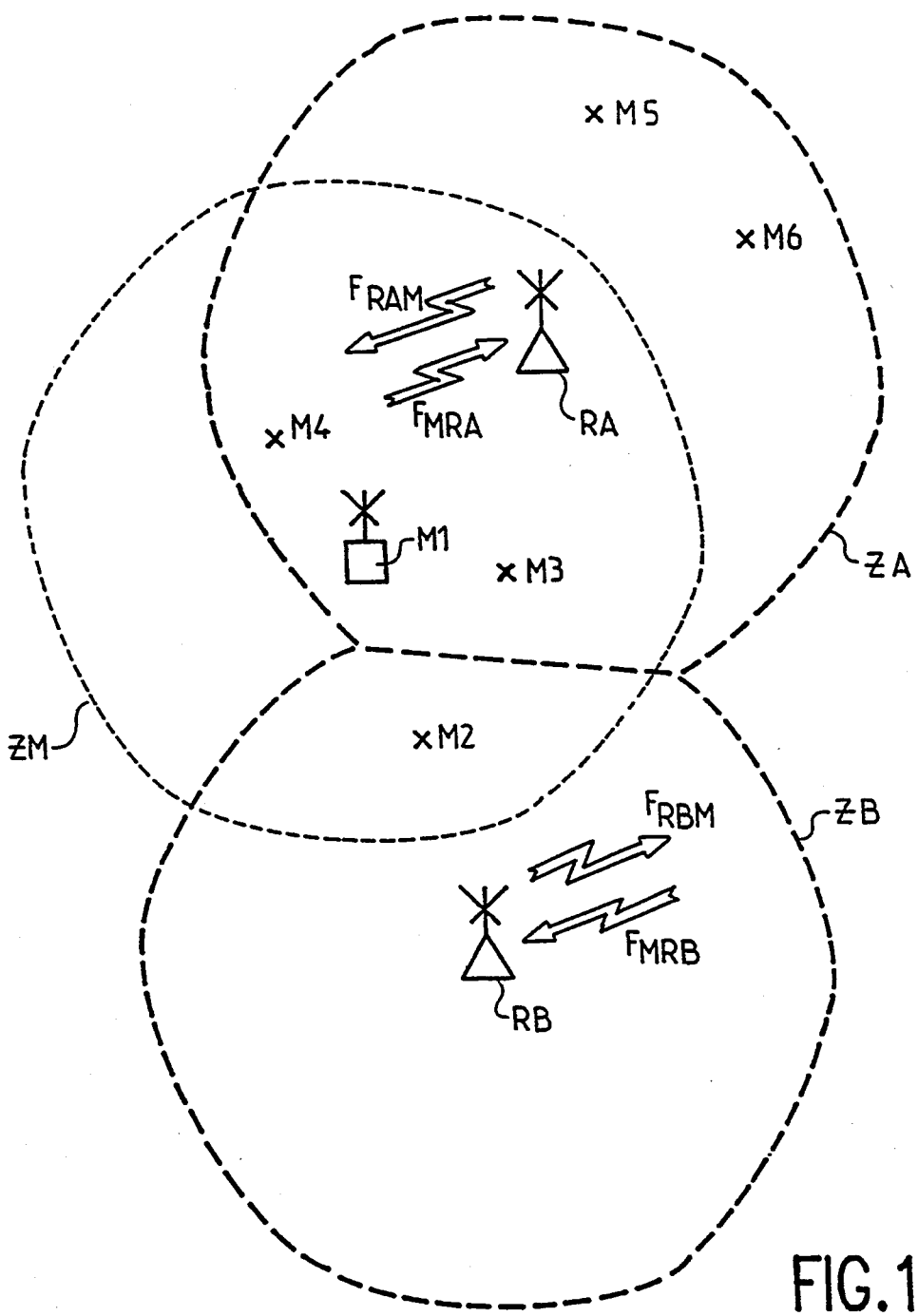
FIG. 1 shows a system according to the invention.

The system shown in FIG. 1 is formed by two base stations RA and RB. The zone ZA, shown in broken lines, is the coverage zone of the station RA and the zone ZB indicated in the same manner is that of the station RB. These two zones are shown as being contiguous for clarifying the explanation, whereas in practice these zones partly overlap. M1, M2, ..., M5, M6 represent different mobile satellite stations which are present, for example, in motorcars.

The stations communicate with one another by radio links which use two frequency channels within each zone, $F_{MRA}$ and $F_{RAM}$ for the zone ZA and channels $F_{MRB}$ and $F_{RBM}$ for the zone ZB. The channels $F_{MRA}$ and $F_{MRB}$ are used for communications from the satellite stations to thebase stations RA and RB, respectively (up channel), whereas the channels $F_{RAM}$ and $F_{RBM}$ are reserved for communications from the base stations RA and RB, respectively, to the satellite stations (down channel).

The communication established in these frequency channels is organized in accordance with timedivision multiplex of the TDMA type.

Figure 2:
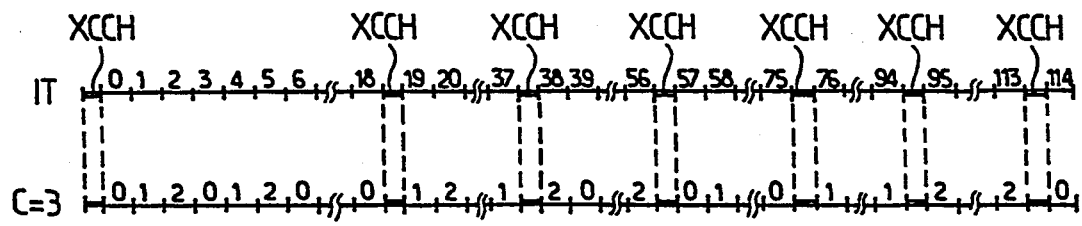
FIG. 2 shows the arrangement of timedivision multiplex channels.

FIG. 2 diagrammatically shows this multiplex arrangement. It is based on that described in published French Patent Application FR-90 12 416 filed Oct.9, 1990 by Applicant. For simplicity's sake, a multiplex arrangement of 3 time-division channels is shown, formed by time intervals numbered from 0 to 2; between each successive 19 of these intervals are inserted time intervals XCCH reserved for controlling the operation of the system. These intervals are accordingly positioned between the time intervals IT 18 and 19, 37 and 38, 56 and 57, etc, while:

time channel 0 corresponds to the intervals IT 0, 3, 6, ..., 18, channel 1 to the intervals 1, 4, 7, ..., 19, and channel 2 to the intervals 2, 5, 8, ..., 20.

Figure 3:
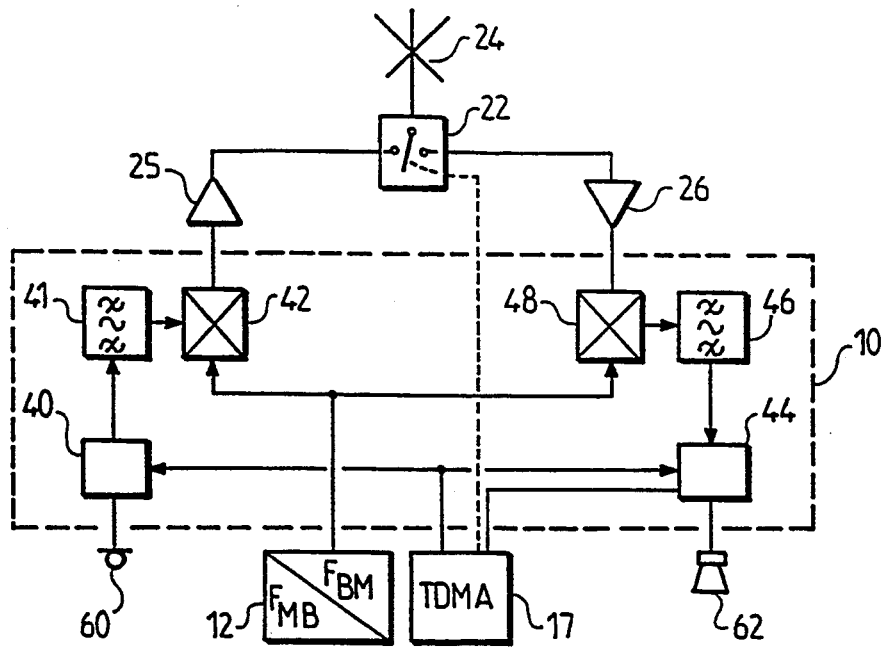
FIG. 3 shows the current arrangement of a station.

FIG. 3 shows the diagram of mobile stations M1, M2, ..., of identical structure.

Each station is formed by a transmission-reception unit 10 controlled by a pair of reference oscillators 12 which oscillate at the frequencies $F_{MB}$ and $F_{BM}$, respectively, which frequencies are capable of assuming values adapted to the different frequency channels, $F_{MRA}$, $F_{MRB}$, $F_{RAM}$, $F_{RBM}$, ..., etc. This assembly adapts itself to a time-division matrix TDMA by means of a matrix controller 17. A duplexing switch 22 controlled by the controller 17 renders it possible simultaneously to transmit at a frequency $F_{BM}$ and to receive at a frequency $F_{MB}$, which may or may not be different from $F_{MB}$, on the same antenna 24. A transmission amplifier 25 and a reception amplifier 26 are connected to this switch 22.

The unit 10 comprises a transmission portion 40 cooperating with a filter 41 tuned to an intermediate frequency FI, and a modulator 42. The modulator 42 tunes the information provided by the portion 40 to the carrier frequency $F_{MB}$. The portion 40 arranges the information to be transmitted in accordance with the commands given by the controller 17, and phase-, frequency- or amplitude-modulates the information on an intermediate frequency FI. This controller 17 also renders it possible to retrieve the various bits of information contained in the time-division matrix by means of a reception unit 44. The input of this unit is connected to the output of a filter 46 tuned to the frequency FI and connected to the output of a demodulator 48. This demodulator 48 receives the signals from the amplifier 26 and those provided at the frequency $F_{BM}$ or $F_{MB}$. Reference numeral 60 denotes the microphone of the user and numeral 62 his loudspeaker. The spoken information is first coded in digital form and then transmitted in a selected one of the time intervals of the matrix transmitted by the carrier $F_{MRB}$ or $F_{MRA}$, which selection is determined by the controller 17. Similarly, the spoken information coming from a far-away user and transmitted in one of the time intervals of the matrix transmitted by $F_{RAM}$ or $F_{RBM}$ is transported back to the loudspeaker after decoding. In addition, the controller 17 achieves that all the XCCH can be received. This leads to a good operation of the system.

According to an embodiment of the invention, the up channel is used for exchanging information between mobile stations for establishing a group call. According to the invention, the exchange of information can be done directly between mobile stations.

Figure 4:
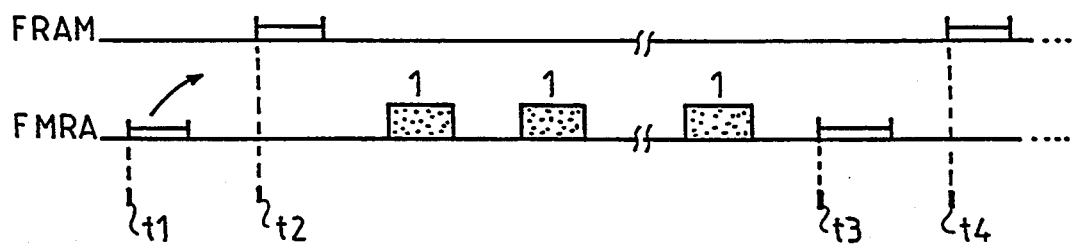
FIG. 4 clarifies the group call process in the case in which a single base station is included.

FIG. 4 illustrates the operation of the system according to the invention (group call process in which a single base station is involved).

At moment t1, the user of satellite station M1 requests a local group call, transmitting the request in one or several time intervals XCCH. This request, examined at the level of thebase station RA, causes it to allocate one or several time intervals of the matrix transported by the group carriers $F_{MRA}$ and $F_{RAM}$. Notice of this is transmitted to the relevant mobile stations via the down channel by means of one or several time intervals XCCH (t2). Once a timedivision channel is allocated, all mobile stations take part in or listen to this channel (in the simplex or semi-duplex mode) after confirmation of the participation of the mobile stations included in the local group call (for example, mobile stations M5 and M6, which are not within the coverage ZM of M1, will not remain on this local group call canal). Subsequently, at moment t3, the requesting station terminates its request for a group call; this is signalled to thebase station in an interval XCCH which, in return, frees the time fraction of the up channel involved in this group call at moment t4.

Figure 5:
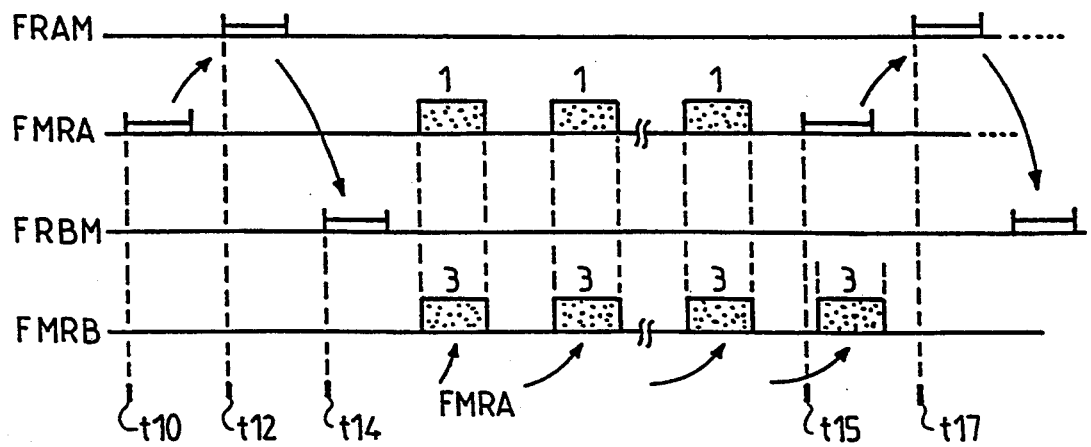
FIG. 5 clarifies the group call process in the case in which two base stations are included.

FIG. 5 clarifies the operation of the system according to the invention when a mobile station M2 is situated in a coverage zone ZB different from the coverage zone ZA to which the requesting subscriber station M1 belongs. The subscriber station M2 is nevertheless situated within the coverage zone ZM of station M1. The various channels TDMA can be synchronized by known techniques so that, after the group call request has been made by the subscriber station M1 at moment t10, the base station RA together with the base station RB determines a time interval which can be common to the two up channels $F_{MRA}$ and $F_{RMB}$ and in which the mobile station M2 can become connected by changing the frequency channel (simplex or semi-duplex); for example, this may be timedivision channel 1 for channel $F_{MRA}$ and 3 for channel $F_{MRB}$. At moment t12, station RA sends notice of the timedivision channel assigned to this group call to the mobile stations of its coverage, and at moment t14 (which may be identical to t12), that also is done by station RB. At moment t15 the request for ending the group call is made, and at moment t16 and t17 (which may be identical) the stations RA and RB free the timedivision channels.

According to this latter process, the station M2, which is near by and within the coverage of M1, can be one of the participants in the group call, whereas stations M5 and M6, which are not inside the coverage ZM of M1, cannot participate in this local group call.

A modification of the invention consists in the use of a group channel which for this reason does not form pan of the resources of the system; for example, it is easiest to use a frequency channel FFR. The procedure is then identical to that explained with reference to FIG. 5 where $F_{MRB}$ is to be replaced by channel FFR, which may then be used continuously and not in the TDMA mode.

Similarly, it is possible to use an intermediate call channel (time-division or frequency-division) for establishing the communication within the group. This is necessary, for example, when it is desirable to include mobile stations outside the network in the group call (for example a station M7, (not shown) which is neither in ZA nor in ZB).

Finally, it should be noted that the process described above may also be used for individual calls; the aim is then, in addition to the spectral efficacy already described, to improve the quality of the communication in certain cases shown in the Figure (for example, in FIG. 1, the connection M1–M3 via base station RA is certainly of a lesser quality than the direct connection M1–M3, since these two stations are close to one another). The same principles are used for this, whereby the direct link is validated, if necessary, by means of the intermediate channel described above, using the time intervals XCCH.

I claim:

1. A radio transmission system comprising at least one base station, each base station having a radio coverage zone, and a plurality of satellite stations at least one of which is situated in a radio coverage zone of said one base station, each base station being operative to transmit information to a satellite station in its coverage zone via an assigned time division multiplex (TDM) time slot in a down frequency transmission channel, each satellite station being operative to transmit information via an assigned TDM time slot in an up frequency transmission channel; characterized in that, upon request by said one satellite station, said one base station is operative to assign a particular TDM time slot in one of said frequency channels as a group call channel for exchange of information between satellite stations in a designated group which includes said one satellite station, without further intervention by said one base station.

2. A radio transmission system as claimed in claim 1, wherein the group call channel is a TDM time slot in the up frequency transmission channel of said one base station.

3. A radio transmission system as claimed in claim 2, comprising at least a second base station having an up frequency transmission channel which is synchronized with the up frequency transmission channel of said one base station, and wherein the group call channel is a TDM time slot which occurs concurrently in the up frequency channels of said one base station and said second base station so as to permit exchange of information between satellite stations which are located in the respective coverage zones of said one base station and said second base station.

* * * * *